US009999836B2

(12) United States Patent
Lampe et al.

(10) Patent No.: US 9,999,836 B2
(45) Date of Patent: Jun. 19, 2018

(54) USER-DEFINED CHANNEL (71) Applicant: Microsoft Corporation, Redmond, WA (US)

(72) Inventors: Kyle Lampe, London (GB); Matthew White, Peterborough (GB); Aimee Freeding, London (GB); James Shepherd, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 599 days.

(21) Appl. No.: 14/085,547

(22) Filed: Nov. 20, 2013

(65) Prior Publication Data

US 2015/0141140 A1 May 21, 2015

(51) Int. Cl.
*H04N 5/445* (2011.01)
*A63F 13/63* (2014.01)
*G11B 27/10* (2006.01)
*G11B 27/34* (2006.01)
*A63F 13/86* (2014.01)
*G11B 27/031* (2006.01)
*H04N 21/2668* (2011.01)
*H04N 21/2743* (2011.01)
*H04N 21/8549* (2011.01)

(52) U.S. Cl.
CPC .............. *A63F 13/63* (2014.09); *A63F 13/86* (2014.09); *G11B 27/031* (2013.01); *G11B 27/102* (2013.01); *G11B 27/34* (2013.01); *H04N 21/2668* (2013.01); *H04N 21/2743* (2013.01); *H04N 21/8549* (2013.01)

(58) Field of Classification Search
CPC .......... H04N 21/4781; H04N 21/8173; H04N 21/2268
See application file for complete search history.

(56) References Cited

U.S. PATENT DOCUMENTS 8,340,493 B2    12/2012  Axen et al.
2008/0139301 A1*  6/2008  Holthe ................. A63F 13/00
                                                       463/25

(Continued)

OTHER PUBLICATIONS

"Aio Cloud", Published on: Mar. 28, 2012. Available at: http://aio.tv/aioCloud/web/faq.html.

*Primary Examiner* — Junior Mendoza
(74) *Attorney, Agent, or Firm* — Mark K. Young; Mayer & Williams PC (57) ABSTRACT

Example apparatus and methods facilitate providing a user-defined channel that presents content from, for example, a virtual video playlist. The playlist may include raw or edited clips of user-generated video content (e.g., video game highlights, smart phone recordings). The clips may be edited with sound, text, graphics, special effects or in other ways and then organized into the playlist. The playlist may be organized to facilitate presenting a collection of clips as a continuous show. For example, a user may produce a playlist of goals scored in their favorite video game. The highlights may be of goals scored by the user, in which case the video may come from the user's device, or of goals scored by other players, in which case the video may come from another users device or playlist. Playback of the playlist may be manipulated with respect to order, frequency, or other parameters.

20 Claims, 8 Drawing Sheets (56) References Cited

U.S. PATENT DOCUMENTS

| | | | |
|---|---|---|---|
| 2009/0070819 A1 | 3/2009 | Gajda et al. | |
| 2009/0131177 A1* | 5/2009 | Pearce | A63F 13/10 |
| | | | 463/43 |
| 2009/0210909 A1* | 8/2009 | Mukerji | H04N 5/44543 |
| | | | 725/51 |
| 2009/0258708 A1* | 10/2009 | Figueroa | G07F 17/3295 |
| | | | 463/43 |
| 2011/0153605 A1 | 6/2011 | Silverman | |
| 2014/0074846 A1* | 3/2014 | Moss | G06F 17/30761 |
| | | | 707/740 |
| 2014/0155154 A1* | 6/2014 | Laakkonen | A63F 13/12 |
| | | | 463/31 |
| 2015/0012926 A1* | 1/2015 | Wei | H04N 21/26258 |
| | | | 725/9 |
| 2015/0100984 A1* | 4/2015 | Hsiung | H04N 21/4825 |
| | | | 725/39 |
| 2015/0165320 A1* | 6/2015 | Perlman | A63F 13/12 |
| | | | 463/31 |

* cited by examiner

USER-DEFINED CHANNEL

BACKGROUND

Part of the experience of playing a video game is doing something remarkable like scoring a goal against an all-star opponent, defeating an arch-rival, dispatching a particularly heinous monster, getting the high score in a multi-player game, or beating your uncle as he plays virtual quarterback for his old team. Another part of the experience of playing a video game is being able to relive and even share those magical moments. For example, a gamer may wish to relive their game-winning goal, to show their friends how they maneuvered the players to set up the game-winning goal, or to show their family how they beat their former college football quarterback uncle again. Similarly, part of the experience of having a phone or tablet or other device that can record video is being able to capture interesting or memorable events, and then being able to relive or share those interesting or memorable events.

Conventionally, a user may have been able to capture a discrete event and store it for later use. The user may even have been able to publish that discrete event or share it with friends or the public. Consumers are familiar with receiving a link to a particular video and watching that particular video. However, the experience is typically limited to watching video concerning one discrete event at a time.

Some gamers who produce an excellent highlight may gain social status in their gaming community when the highlight "goes viral". Similarly, a user who captures a particularly poignant or interesting video may gain social status when their video is widely distributed or viewed. Not all gamers and not all producers of content may be equally skilled. For example, there may be gamers who excel at playing a game, but who are challenged when it comes to presenting their highlights. However, there may be gamers who do not produce highlight-worthy performances but who have real skill in selecting, editing, enhancing, and then sharing others' highlights. Conventionally, both gamers and commentators may have been limited by the single-shot, discrete nature of highlights and other content. Hunting for individual events one at a time and then clicking on the individual events to watch discrete highlights may provide a choppy, disconnected experience.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example methods and apparatus are directed towards providing a customizable user-defined channel. A channel displays content, therefore example methods and apparatus may identify content (e.g., a highlight clip generated by a player of a video game) to be included on the channel. The content may benefit from being edited (e.g., shortened, titled, graphics inserted). Therefore example methods and apparatus may selectively edit the content to produce an edited clip. For example, a video game highlight may be enhanced by being reduced from 15 seconds to 3 seconds, by having a title displayed, and by having an arrow point to the interesting part of the scene. Since the clip may be added to a collection of clips, metadata about the clip may be added. The metadata may include, for example, information useful for finding the clip (e.g., name) or for describing the clip (e.g., length). The edited clip may then be added to a user-defined channel. Raw clips may also be added. The creator of the clip may add it to their own user-defined channel or another user may add the clip to their user-defined channel. The user-defined channel may then be made available for viewing, where the viewing experience may be a continuous and potentially continually updated display.

Example methods and apparatus may be configured to store video game highlight clips for presentation on a user-defined channel. The highlight clips may be generated by players of the video game and then added to the playlist for the user-defined channel by the owner of the user-defined channel. The owner of the user-defined channel may or may not be the player who generated the video game highlight. More generally, example apparatus and methods acquire user-generated video content (e.g., video game highlight clip), selectively edit and annotate the content, and organize the content in a virtual video playlist that is available for display on the user-defined channel. The user-defined channel may be customized with respect to the order in which elements of the playlist are presented, the frequency with which elements of the playlist are presented, and in other ways.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods facilitate providing a user-defined channel. A user-defined channel may include, for example, a virtual video playlist that facilitates displaying a number of highlights as a continuous experience instead of simply displaying a single highlight. The virtual video playlist may be associated with a specific user. The virtual video playlist may include content generated by the specific user or content generated by another user and then added by the specific user. Example apparatus and methods facilitate automatically curating disparate pieces of user-generated content, which may be referred to herein as "clips", into a cohesive yet dynamic representation of a user's actions or selections to provide a compelling seamless viewing experience. Rather than moving from discrete highlight to discrete highlight using a search and click approach, a user may configure their user-defined channel to show a looping highlight reel of the highlights, both theirs and others that they have selected. In one embodiment, the highlights may be edited or enhanced with voice-overs, text, graphics, or other effects. While highlights are described, more generally, user-generated video content may be acquired, edited, organized and provided as a viewable collection on a user-defined channel as controlled by a playlist.

In one embodiment, the user-defined channel may be a virtual video playlist of highlights generated by a user (e.g., gamer) of a video gaming console. The user-defined channel may be associated with the gamer's identity. For example, the gamer may have an account with a game console provider or game provider and the channel may be associated with that account. The provider may make memory available for the gamer to populate with content. The memory may be available in the game console, in the cloud, in devices associated with the provider, or elsewhere. The content may be highlights generated by the gamer or highlights generated by other gamers and selected by the gamer. The channel may be a repository for the gamer's favorite content, whether the gamer generated the content or someone else generated the content.

In one embodiment, the user-defined channel may include customized or personalized content. For example, a gamer may generate a highlight clip of a particularly interesting action they performed in a game. The highlight clip may be acquired from a recording application that runs simultaneously with the video game, from a game's replay buffer, or from other data stores. In one embodiment, the gamer may record a voice-over to be associated with the highlight. In one embodiment, the gamer may edit the highlight by adding graphics, text, lighting effects, or other video effects (e.g., picture-in-picture, side-by-side, slow motion). Metadata (e.g., clip name, clip producer, clip length) may be associated with the clip. The gamer may then add the edited highlight clip to their channel. Other users may see the edited highlight clip and add that clip to their channel as well. Additionally, the gamer may view highlight clips available in other gamer's user-defined channels and add them to their own user-defined channel.

In one embodiment, a user-defined channel may present multiple pieces of content in order. For example, a collection of video game highlight clips may be shown in order. In one embodiment, the order in which different pieces of content (e.g., highlight clips) are presented may be controlled either automatically or by the viewer. For example, most recently generated highlight clips may automatically be presented more frequently while less recently generated highlight clips may automatically be presented less frequently. Additionally, a viewer may control the frequency with which a clip is to be presented or the order in which a clip is to be presented. In one embodiment, the frequency or order in which a clip is presented may be based, at least in part, on how popular that clip has become. For example, a clip that has "gone viral" and has been seen by a large number of viewers in a short time may be presented first and may be presented frequently while a clip that has only been viewed twice in six months may be presented last and only once in an entire cycle through the set of content associated with the user-defined channel.

In one embodiment, clips in a user-defined channel may be shown in order with frequency control. In another embodiment, the clips in a user-defined channel may be shown out-of-order as controlled by a user selection. For example, a user may "fast-forward" to a specific clip, "jump" to a specific clip, "rewind" to a specific clip, or otherwise navigate non-linearly through a user-defined channel.

Memory is a finite thing. Therefore, a user may be allocated a certain amount of memory for their user-defined channel. The memory may exist in the gaming device, in the cloud, at a game server, through a service, or elsewhere. The user may be able to add content (e.g., video game highlights) to their user-defined channel and, since memory is finite, may also be able to remove content from their user-defined channel. In one embodiment, an automated process may suggest content that a user may wish to consider removing. For example, the oldest content may be suggested for removal, the least-frequently content may be suggested for removal, the content that is the least popular in a social context may be suggested for removal, or content that may be duplicate may be suggested for removal. Other approaches for suggesting content to consider for removal may be employed.

A game console, tablet, phone, or other viewing device may include a channel guide. The channel guide may include commercially available channels (e.g., all movie network, all sports network). In one embodiment, a user-defined channel may be displayed by the channel guide. To facilitate identifying the user-defined channel, a user may be able to name their channel, associate a stock or custom graphic with the channel, provide metadata about the channel, or to take other actions that facilitate integrating the user-defined channel into the channel guide. The metadata may describe, for example, the creator of the channel, the number of clips on the channel, the running time for the collection, a social ranking for the channel, a time at which the channel was last updated, how many times the channel has been viewed, how many people are currently viewing the channel, or other information.

Figure 1:
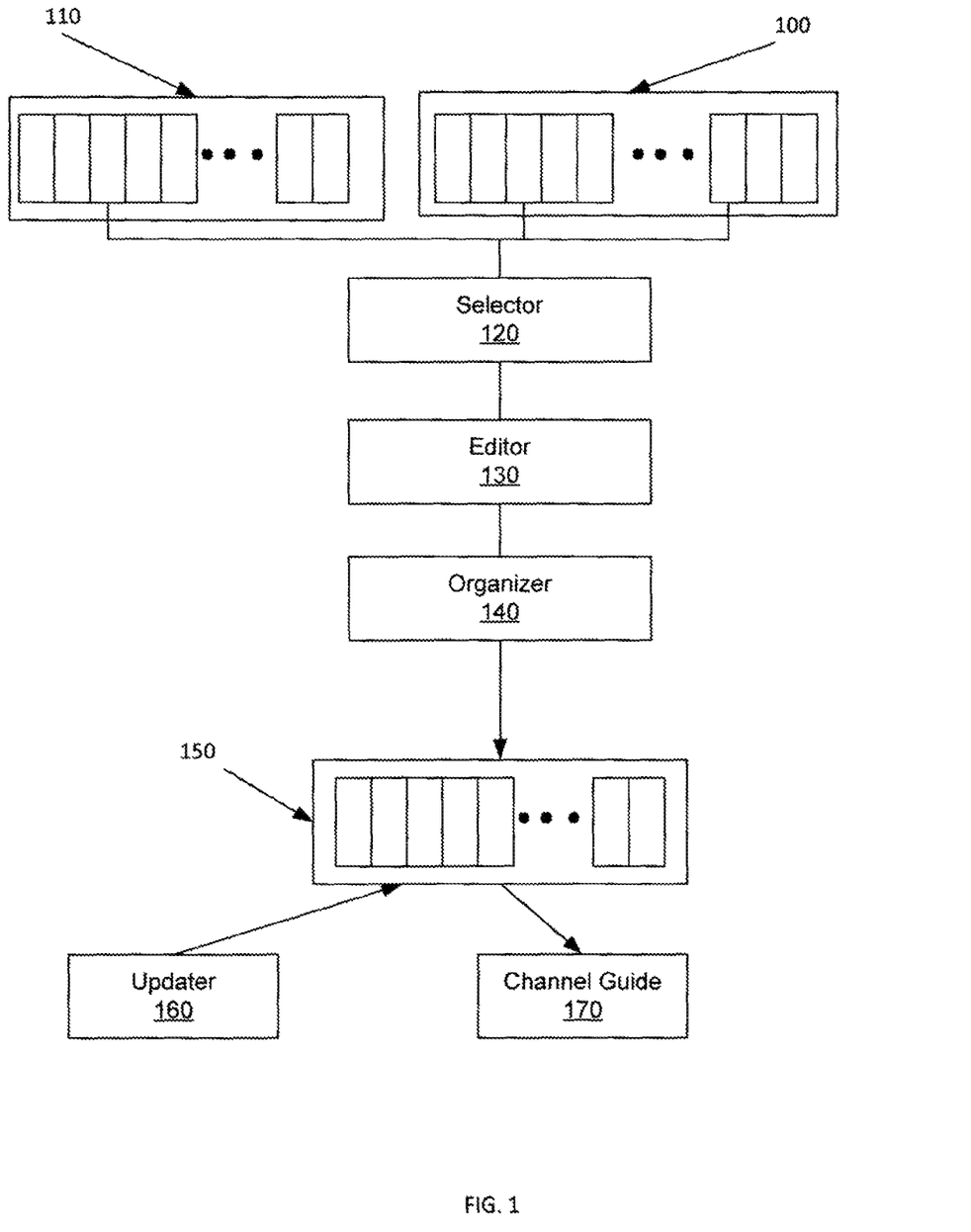
FIG. 1 illustrates an example data flow associated with a user-defined channel.

FIG. 1 illustrates a data flow associated with providing a user-defined channel. A first collection 100 of user-generated content may include highlight clips from a video game. The highlight clips may be automatically generated by the video game, created by a gamer, or produced by others. A second collection 110 of user-generated content is also illustrated. While two collections of user-generated content are illustrated, a greater or lesser number of collections may be processed. The collection 100 may be from a first gamer and the collection 110 may be from a second gamer.

A selector 120 selects clips to be included in a user-defined channel. The selector 120 may select from the collections 100 and 110. The selector 120 may act automatically or may be controlled on a clip-by-by basis by a user or users. An editor 130 may be used to process clips selected by the selector 120. For example, clips may be shortened, may have sound added or removed, may have text or graphics added, or may be edited in other ways. An organizer 140 arranges clips, either edited or raw, into a virtual video playlist 150 associated with the user-defined channel. The organizer 140 may place the clips automatically (e.g., based on creation time) or may be controlled to place the clips at a specific location by a user. A user-defined channel may not be a static thing as new clips may become available and as old clips may lose interest. Thus, an updater 160 may manipulate the virtual video playlist 150 by adding, removing, or re-arranging highlight clips in the virtual video playlist.

A short video may include a first number of frames (e.g., 30,000 frames). In the era of celluloid video film, a short highlight would be "clipped" from a video tape using a mechanical cutting device referred to as a splicer. The video tape may have been hundreds of yards long and stored on large metal spools. The "clip" would have been cut using a cutting tool. The clip may have included just a hundred frames. In the digital era, the term "clip" is still used to refer to a subset of frames selected from a larger set of frames. By way of illustration, a video game may record the last five minutes of game play. At thirty frames per second, the video may include 9,000 frames. The last five minutes as recorded in the 9,000 frames may be referred to as a video. A shorter highlight selected from the longer video may be referred to as a highlight clip or clip. The shorter highlight may be, for example, three seconds long and may include just 90 frames. While a mechanical cutting device is not used to edit digital video data, a logical cut is performed and thus the shorter highlight may be referred to as a clip.

Figure 2:
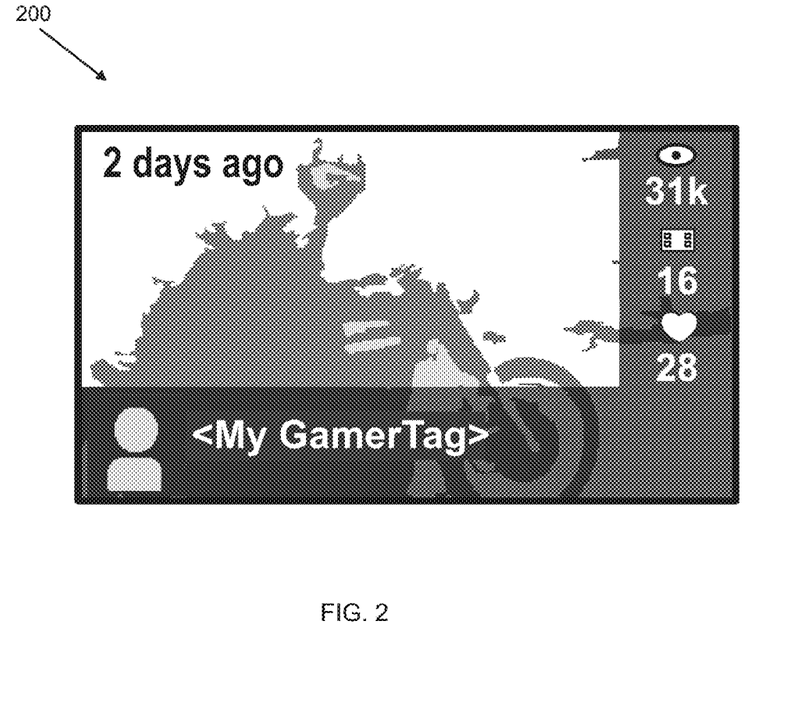
FIG. 2 illustrates an example user interface associated with a user-defined channel.

A channel guide 170 may display information about the user-defined channel. For example, FIG. 2 illustrates an example screen shot 200 of a user interface that is displaying the availability of a user-defined channel. The screen shot 200 shows a channel title (e.g., MyGamerTag), a picture of the gamer, a number of clips in the channel (e.g., 16), a total number of views of the channel (e.g., 31) and a number of times the channel has been tagged as a favorite (e.g., 28) by other viewers. The screen shoot 200 also displays a time at which the user-defined channel was last updated (e.g., 2 days ago), which may include when the last clip was created or added. Screen shot 200 may be displayed as part of an electronic viewing guide, may be displayed after a user selects a line item or graphic from an electronic viewing guide, or at other times.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
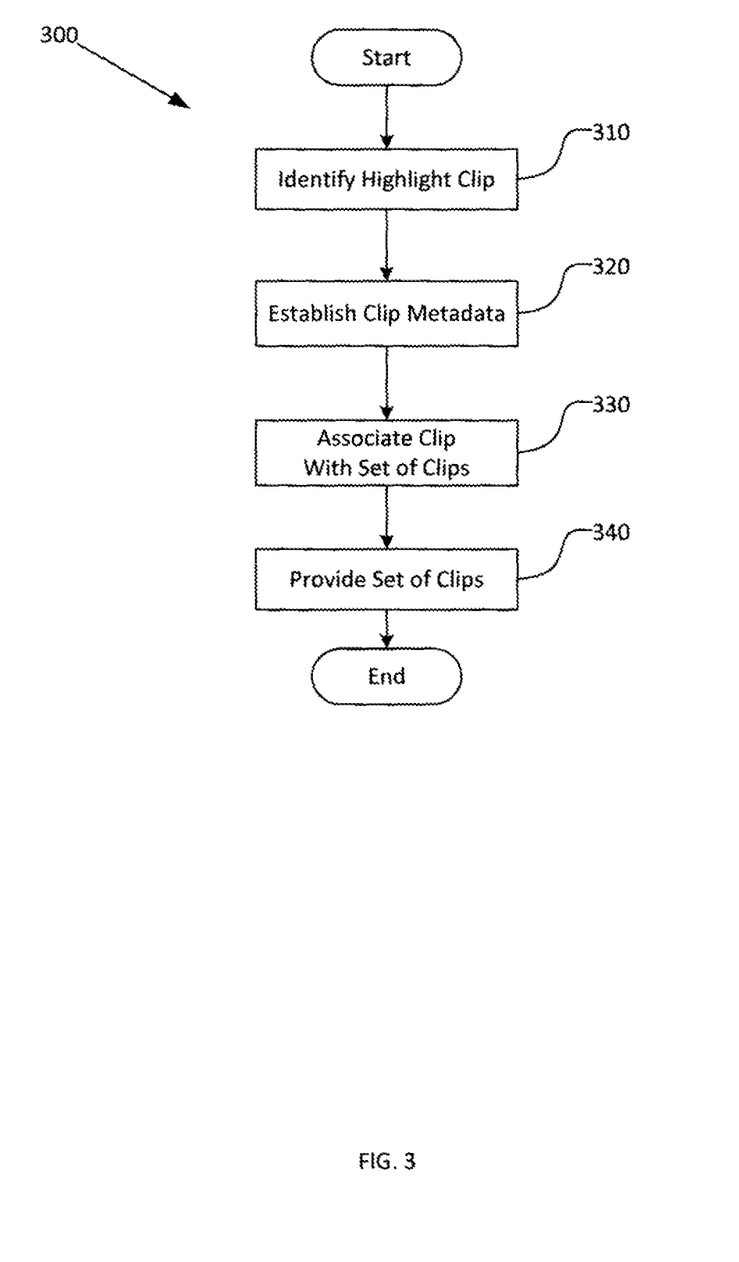
FIG. 3 illustrates an example method associated with providing a user-defined channel.

FIG. 3 illustrates an example method 300 associated with providing a user-defined channel. Providing a user-defined channel may include making available for viewing a continually updating playlist of user-generated content like video game highlight clips or video captured from a smart phone, tablet, or other digital camera. Method 300 may include, at 310, identifying a highlight clip associated with a video game. A highlight clip refers to a short (e.g., 3 second, 8 second) section of a larger experience. While 3-8 seconds are described, highlight clips may be shorter or longer. The subject matter of a highlight clip may be remarkable (e.g., game winning goal) or may be unremarkable (e.g., routine pass play completed in football). Thus, a short section of a larger experience may become a "highlight clip" by designation (e.g., user selection) rather than by content.

In one embodiment, identifying the highlight clip at 310 may include an explicit action where a user goes to a data store (e.g., replay buffer) and interacts with a user interface to select a clip from a longer section of data. In one embodiment, identifying the highlight clip may be the result of an explicit action where a user accesses a data store (e.g., buffer of highlight clips automatically generated by video game) and interacts with a user interface to select a clip from the stored clips. In one embodiment, identifying the highlight clip may be the result of programming an automatic highlight clip generator to produce certain types of highlights. In yet another embodiment, identifying the highlight clip may by the result of viewing a different user-defined channel and selecting a highlight clip to be added. More generally, method 300 may include identifying a user-generated content (e.g., video game clip, digital camera clip) to include in the virtual video playlist.

The highlight clip may be stored in different locations. In one embodiment, the highlight clip may be stored in a computer memory on a device on which the video game was played. In another embodiment, the highlight clip may be stored in a computer memory on a server associated with the video game. In yet another embodiment, the highlight clip may be stored in a service. When the "highlight clip" is video from a digital camera (e.g., smart phone, tablet), then the highlight clip may be stored in the device that captured the video. In one embodiment, portions of the highlight clip may be distributed between co-operating memories.

Method 300 also includes, at 320, establishing clip metadata for the highlight clip. A highlight clip does not exist in a vacuum. At the very least, the highlight clip has an address since bits that store the digital content must be stored somewhere. The address is data about the content. In different embodiments, the clip metadata may include information for identifying a clip (e.g., name) or information for organizing the clip (e.g., generation date, editing date, player, length). The metadata may also include, for example, a date on which the highlight clip was associated with the set of clips, which may be used for aging out the clip for eventual removal. The metadata may also include later created metadata. For example, the highlight clip may be rated by other viewers, may be identified as a favorite by other viewers, or may be the subject of other social media commentary.

The clip metadata may be produced or stored in different devices. In one embodiment, the clip metadata may be produced and stored on a device on which the video game was played. In another embodiment, the clip metadata may be produced on a device for editing highlight clips and the clip metadata may then be stored on a user-defined channel server. Various combinations of production locations and storage locations may be employed.

Method 300 also includes, at 330, associating the highlight clip with a set of clips arranged in a virtual video playlist associated with an owner. In different embodiments, associating the highlight clip with the set of clips in the virtual video playlist may be performed in different ways. For example, associating the highlight clip with the set of clips may include storing the highlight clip with the set of clips or storing a pointer to the highlight clip with pointers associated with the set of clips. Associating the highlight clip with the set of clips may also include, for example, storing the highlight clip on the device an which the highlight clip was generated, storing the highlight clip on the device on which the highlight clip was edited, storing the highlight clip on a remote device, or storing the highlight clip using a service. As a user-defined channel evolves and is viewed, some highlight clips may be migrated to one device while other highlight clips are migrated to another device. For example, highlight clips that are viewed most frequently may be migrated to the device on which the clips are viewed while highlight clips that are viewed least frequently may be migrated to lower-cost or higher-capacity memory further from the viewing device.

Method 300 also includes, at 340, providing the set of clips for viewing collectively on a user-defined channel. The order, frequency, or other parameters that control how the set of clips will be viewed seamlessly as part of a single user-defined channel may be controlled by the virtual video playlist. In one embodiment, providing the set of clips for viewing collectively comprises providing the set of clips for viewing on a device on which the highlight clip was generated. For example, if the clips are highlight clips of a video game played on a video game console, then the set of clips may be stored or otherwise made available to the video game console. In another embodiment, providing the set of clips for viewing may include storing or presenting the highlight clips on a device on which the highlight clip was edited. For example, a gamer may play video games on a game console but edit and watch highlight clips on a laptop computer. In this embodiment, the highlight clips may be stored on the laptop instead of on the game console. In one embodiment, a gamer may play on one device (e.g., game console), edit on another device (e.g., laptop) and then view the user-defined channel on yet another device (e.g., tablet). Thus, providing the set of clips for viewing may include storing or making the clips available on another device, or even through a service. In different embodiments, the user-defined channel may be made available by using a combination of devices, memories, and delivery approaches.

A user-defined channel may change over time. Thus, in one embodiment, providing the set of clips for viewing collectively comprises automatically controlling the frequency with which members of the set of clips are presented or controlling the order in which members of the set of clips are presented. The frequency or order may be changed based, for example, on a random ordering process or on a random frequency process. In one embodiment, the frequency or order may be changed based on how (in)frequently a channel or clip is viewed, when the channel or clip was created, or on other factors.

Figure 4:
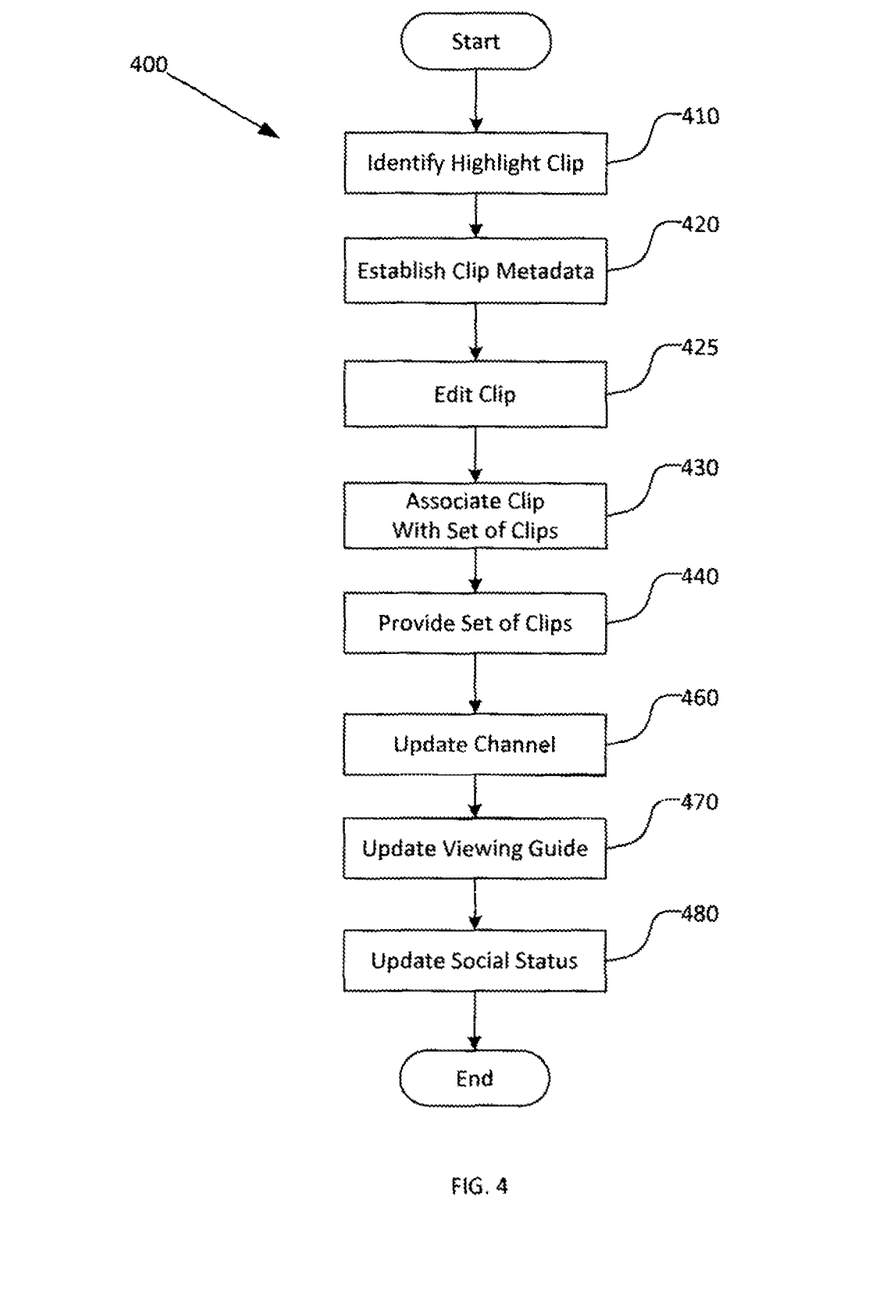
FIG. 4 illustrates an example method associated with providing a user-defined channel.

FIG. 4 illustrates an example method 400 associated with providing a user-defined channel. Method 400 includes several actions similar to those described in connection with method 300. For example, method 400 includes, at 410, identifying a highlight clip, establishing metadata at 420, associating the highlight clip at 430 with a set of clips arranged in a virtual video playlist and providing the set of clips for viewing collectively on a user-defined channel at 440. However, method 400 includes additional, different actions.

For example, method 400 includes, at 425, selectively editing the highlight clip. While raw highlight clips may be displayed on the user-defined channel, some highlight clips may be improved or enhanced by editing. In one embodiment, editing the highlight clip includes adding a voice-over to the highlight clip. The voice over may be a play-by-play like description for a game, or may be a step-by-step guide when the highlight concerns, for example, fixing a refrigerator. The editing may also include, for example, trimming the highlight clip to a shorter length or adding another highlight clip to the highlight clip. Editing the highlight clip may also include, for example, adding text to the highlight clip or adding a graphic to the highlight clip. The text or graphic may be for entertainment, education, or other purposes. For example, when the highlight clip concerns disclosing how to unlock hidden content by touching a specific leaf on a flower then an arrow pointing to the flower may be helpful along with text that says "touch here." In one embodiment, the editing may include adding a video effect to the highlight clip. The video effect may be, for example, a picture-in picture effect where two or more different perspectives of a single action are provided (e.g., top view, side view, perspective view). The video effect may also be a side-by-side effect where two different players are shown together to facilitate comparing and contrasting their approaches. The video effect may also be, for example, a timing effect, where some of the clip is shown in slow motion while another portion is shown in fast motion. Other edits, effects, and combinations of edits and effects are possible. In one embodiment, an editor for editing the highlight clip runs on a device on which the video game was played. In another embodiment, the editor may run on a server associated with a video game, or even in a user-defined channel service.

Method 400 also includes, at 460, updating the user-defined channel. Updating the user-defined channel may include, for example, selectively adding members to the set of clips, selectively removing members from the set of clips, selectively changing the order in which members of the set of clips are presented, selectively changing the frequency with which members of the set of clips are presented, or other actions. Members may be added or removed based on an explicit user action. For example, a user may drag a new clip into the playlist or drag an existing clip out of a playlist. Members may also be added or removed automatically. For example, a gamer may configure their video game or highlight clip editor to automatically insert clips into their user-defined channel. Additionally, a gamer may program their user-defined channel to remove clips that are poorly reviewed by other gamers, that are viewed less than a threshold number of times, that are beyond a threshold age, or based on other factors.

Method 400 also includes, at 470, updating an electronic viewing guide with information concerning the user-defined channel. The information concerning the user-defined channel may include a channel name, channel owner, or recognizable graphic associated with the channel so that the channel can be identified. The information may also include a number of clips associated with the channel, a rating associated with the channel or a running time for the channel to facilitate making a decision concerning whether to watch the channel. The information may also include a placement indicator for the channel to facilitate displaying the user-defined channel at a desired location with respect to other channels whose information is displayed by the electronic viewing guide. Other information may be provided.

Method 400 also includes, at 480, updating a social status associated with the player of the video game or the owner of the user-defined channel. The update to the social status may be based, at least in part, on a popularity of the highlight clip or a popularity of the user-defined channel. For example, if a user-defined channel has become very popular, then the social status of the gamer may be enhanced which may in turn result in the channel be surfaced in "favorites" lists or "most-watched" lists. Updating the social status may provide incentives for gamers or aggregators to produce, collect, and share highlights, which may in turn increase the popularity of a video game.

While FIGS. 3 and 4 illustrate various actions occurring in serial, it is to be appreciated that various actions illustrated in FIGS. 3 and 4 could occur substantially in parallel. By way of illustration, a first process could acquire user-generated content, a second process could edit, annotate, or organize user-generated content into a user-defined channel, and a third process could provide the user-defined channel for viewing in a seamless experience as a virtual video playlist. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 or 400. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 5:
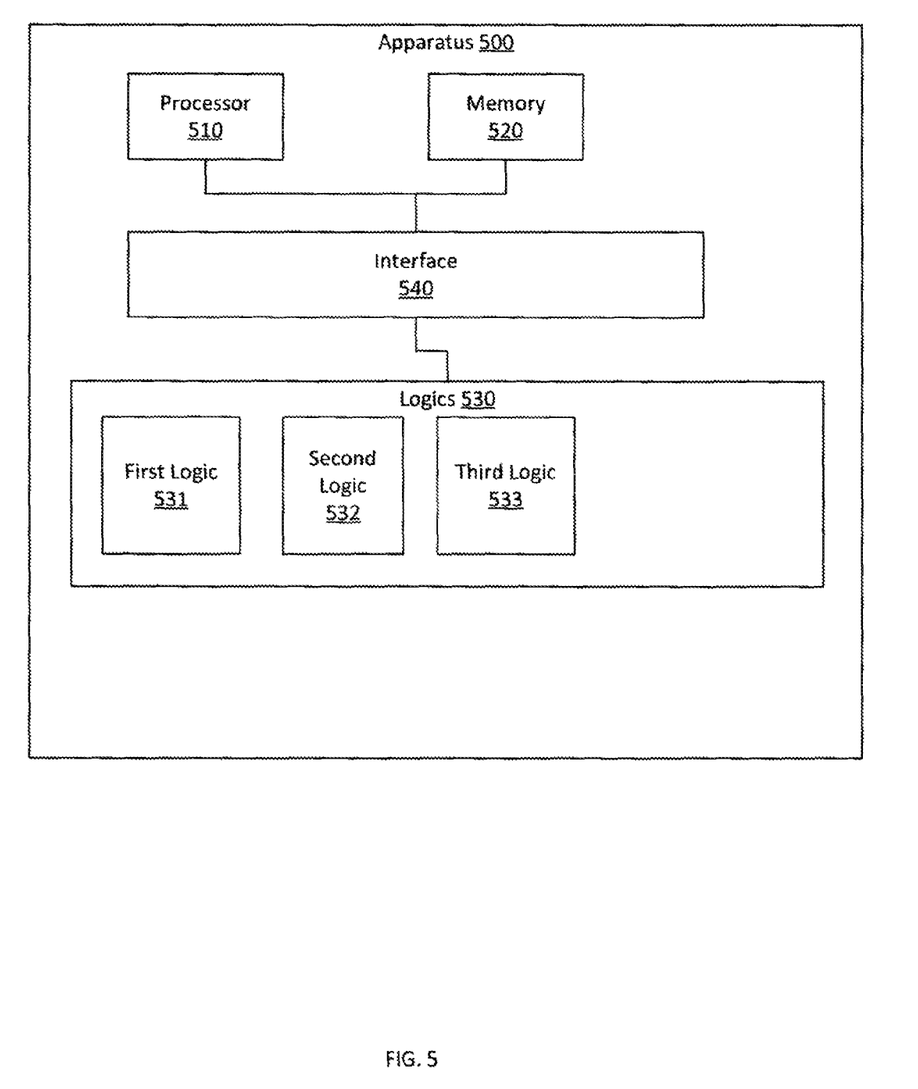
FIG. 5 illustrates an example apparatus associated with providing a user-defined channel.

FIG. 5 illustrates an example apparatus 500 that is configured to provide a user-defined channel. Apparatus 500 may be, for example, a video game console. In one example, the apparatus 500 includes an interface 540 that is configured to connect a processor 510, a memory 520, and a set 530 of logics. Elements of the apparatus 500 may be configured to communicate with each other, but not all connections have been shown for clarity of illustration. In one embodiment, the apparatus 500 may be a general purpose computer that has been transformed into a special purpose computer through the inclusion of the set of logics 530. Apparatus 500 may interact with other apparatus, processes, and services through, for example, a computer network.

The set 530 of logics may be configured to acquire clips, edit and organize clips for a user-defined channel, and provide the collection of clips as a virtual video playlist. The set 530 of logics may include a first logic 531 that is configured to acquire user-generated video content. In one embodiment, the first logic 531 is configured to acquire the user-generated video content from an automatic highlight producer associated with a video game. The automatic highlight producer may detect certain interesting events (e.g., reaching waypoint, scoring winning goal) and automatically produce a highlight clip for the player. The first logic 531 may be configured to acquire this highlight clip. The first logic 531 may also be configured to acquire a highlight clip from a video game data store in response to a user interface action. For example, a user may scan back through action stored by the video game and select a section of the playback as a highlight clip. The first logic 531 may also be configured to acquire a highlight clip from an application data store in response to a user interface action. For example, an application separate from the video game may be recording video game play. A user may watch the game action stored by this separate application and select a portion as a highlight clip. The first logic 531 may also be configured to accept a highlight clip from a highlight producer associated with a player of the video game. For example, a separate application may be scanning the video game play, either in real-time or from a data store, and identify noteworthy incidents. In different embodiments, highlight clips may not be only from a video game. Thus, first logic 531 may be configured to accept a highlight clip from a memory in a phone configured with a video camera or from a video camera or other camera. In this embodiment, the subject matter of the "highlight" clip may not be of a video game, but may be of a subject (e.g., dog catching Frisbee, sailboat crossing sunset) that interested the person using the camera. The first logic 531 may also be configured to accept highlight clips from other virtual video playlists in response to a user interface action. For example, a gamer may be watching a different gamer's user-defined channel and notice a highlight clip that they would like to include in their own user-defined channel. The gamer may perform a user-interface action (e.g., drag and drop) to indicate that the other clip is to be inserted into their virtual video playlist.

The set 530 of logics may also include a second logic 532 that is configured to organize the user-generated video content into the virtual video playlist. Organizing the user-generated video content may include determining an initial order for highlight clips, determining an initial frequency with which clips are to be played, or other factors. Organizing the user-generated video content may also include identifying criteria that will determine the frequency or order in which clips are played. For example, a user may configure the user-defined channel to continually update the virtual video playlist by aging highlights so that newer clips are played more frequently and older clips are played less frequently. Another user may configure the user-defined channel to continually update the virtual video playlist to play clips that other viewers are watching most frequently.

Clips may be stored in different places. In one embodiment, the second logic 532 may be configured to store the user-generated video content in single locations or in a combination of locations. For example, the second logic 532 may be configured to store the clips in a combination of the memory on the apparatus, in a memory associated with a device from which the user-generated video content was acquired, and in a service. The clips may be distributed based on factors including, for example, storage cost, time to acquire a clip, bandwidth availability, or other factors. For example, a clip may be stored at a location that provides a maximized value computed from storage cost and bandwidth cost.

The set 530 of logics may also include a third logic 533 that is configured to control how the user-generated video content associated with the virtual video playlist is played. In one embodiment, the third logic 533 is configured to control the order in which an element of the virtual video playlist is played or the frequency with which the element of the virtual video playlist is played based, at least in part, on an age of the element, a creator of the element, a number of times the element has been viewed, a popularity of the element, or a length of the element. The third logic 533 therefore facilitates continually updating the virtual video playlist to reflect a user's actions. For example, if a user is playing video games and generating highlights the user-defined channel will be updated with the gamer's own highlights. But if the gamer is watching other player's highlights and selecting them, then the user-defined channel may be updated with other's highlights. The frequency with which a gamer replays certain portions of the user-defined channel may affect the order or frequency of clips in the user-defined channel. For example, if the user starts their user-defined channel and instantly fast-forwards to a particular highlight, then that highlight may be replicated and placed at the start of the virtual video playlist.

Processor 510 may be, for example, a signal processor, a microprocessor, an application specific integrated circuit (ASIC), or other control and processing logic circuitry for performing tasks including signal coding, data processing, input/output processing, power control, or other functions. Processor 510 may be configured to interact with logics 530 that provide a user-defined channel.

Memory 520 can include non-removable memory or removable memory. Non-removable memory may include random access memory (RAM), read only memory (ROM), flash memory, a hard disk, or other memory storage technologies. Removable memory may include flash memory, or other memory storage technologies, such as "smart cards." Memory 520 may be configured to store a highlight, a collection of highlights, information for accessing a highlight channel, raw clips, edited clips, video capture from which a clip may be produced, content, a collection of content, information for accessing a user-defined channel of user-selected content, or other information.

Figure 6:
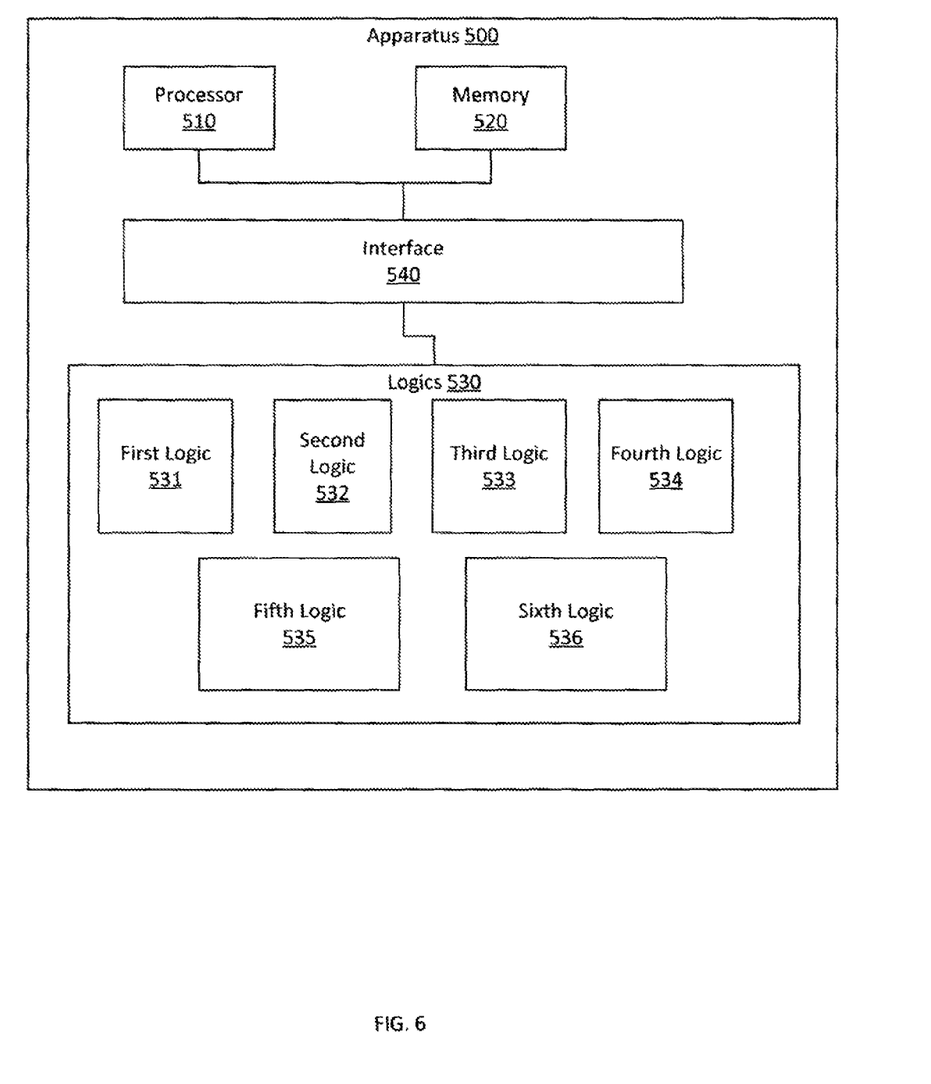
FIG. 6 illustrates an example apparatus associated with providing a user-defined channel.

FIG. 6 illustrates another embodiment of apparatus 500. This embodiment of apparatus 500 also includes a fourth logic 534. Fourth logic 534 may be configured to edit user-generated video content. The fourth logic 534 may be configured to add a voice-over to the user-generated video content. For example, a gamer may introduce themselves, introduce the game being played, introduce the scene in the game, and then do a play-by-play like commentary of the action. The fourth logic 534 may also be configured to add music to the user-generated video content, to combine two or more pieces of user-generated video content into a single piece of user-generated video content, to add text to the user-generated video content, to add a graphic to the user-generated video content, or to add a video effect to the user-generated video content. The video effect may be, for example, a picture-in-picture effect where a first display shows the "game camera" and a second display shows a different perspective of the action. The text may identify, for example, who is playing or may provide some witty or instructive comment about the action.

This embodiment of apparatus 500 also includes a fifth logic 535. Fifth logic 535 may be configured to manipulate a social status of a user that generated the user-generated video content. In one embodiment, the social status may be manipulated based, at least in part, on a popularity of the virtual video playlist. The social status may be manipulated as, for example, an incentive for gamers or users to produce and share highlights on their user-defined channels.

This embodiment of apparatus 500 may also include a sixth logic 536. Sixth logic 536 may be configured to manage a playlist guide that presents information about the virtual video playlist. Managing the playlist guide may include inserting information about the user-defined channel into the playlist guide. The information inserted into the playlist guide may include, for example, a name for the channel, a graphic uniquely identified with the channel, social status information associated with the channel (e.g., $7^{th}$ most popular channel about game XYZ), play length information, or other information.

Figure 7:
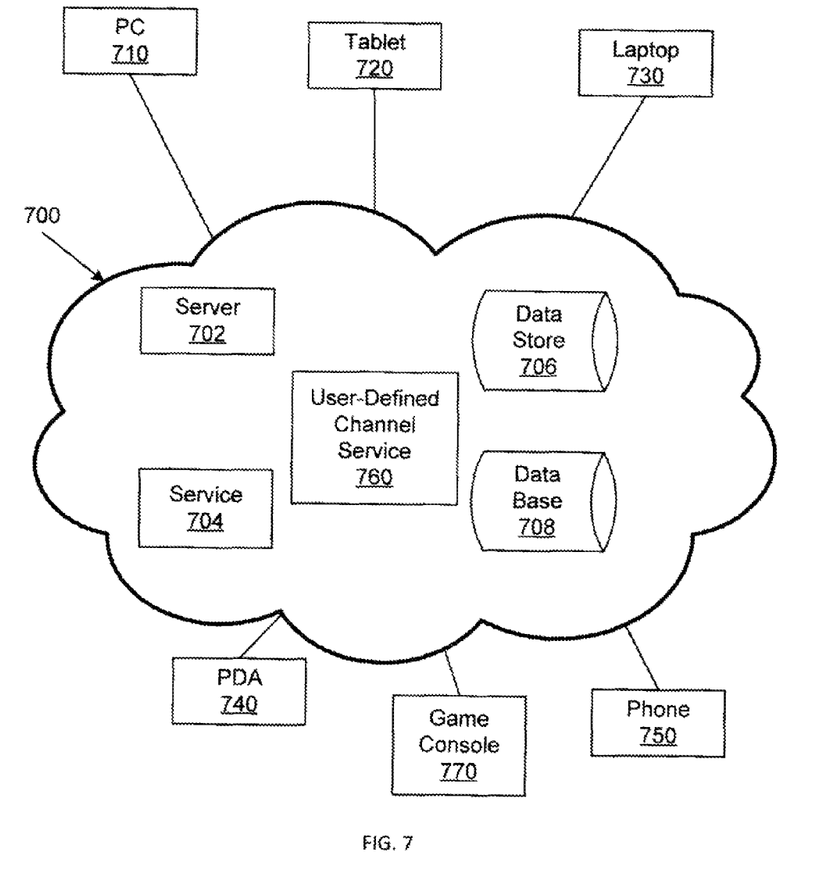
FIG. 7 illustrates an example cloud operating environment in which a user-defined channel service may operate.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, a game console, or in other ways.

FIG. 7 illustrates an example user-defined channel service 760 residing in the cloud. The user-defined channel service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the user-defined channel service 760.

FIG. 7 illustrates various devices accessing the user-defined channel service 760 in the cloud. The devices include a computer 710, a tablet 720, a laptop computer 730, a personal digital assistant 740, a mobile device (e.g., cellular phone, satellite phone) 750, and a game console 770. It is possible that different users at different locations using different devices may access the user-defined channel service 760 through different networks or interfaces. In one example, the user-defined channel service 760 may be accessed by a mobile device 750. In another example, portions of user-defined channel service 760 may reside on a mobile device 750. User-defined channel service 760 may perform actions including, for example, identifying clips to include in a playlist for a channel, editing clips, arranging clips in the playlist, or controlling the order and frequency with which clips are displayed from the playlist on the channel. In one embodiment, user-defined channel service 760 may perform portions of methods described herein (e.g., method 300, method 400).

Figure 8:
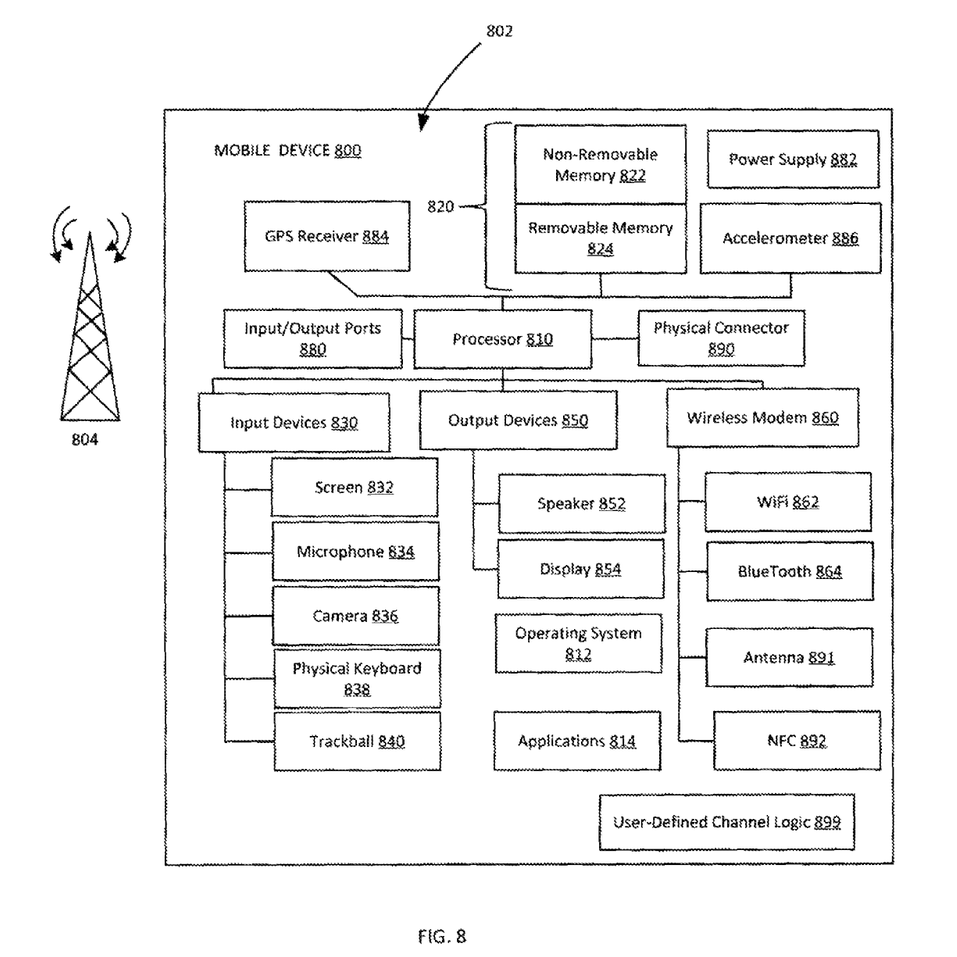
FIG. 8 is a system diagram depicting an exemplary mobile communication device configured with logic for interacting with a user-defined channel.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), etc.) and may allow wireless two-way communications with one or more mobile communications networks 804, such as a cellular or satellite networks. A gamer may interact with a video game being hosted on a game console using mobile device 800. Additionally, a user may interact with an application or process that facilitates generating, editing, and aggregating highlight clips using mobile device 800.

Mobile device 800 can include a controller or processor 810 (e.g., signal processor, microprocessor, application specific integrated circuit (ASIC), or other control and processing logic circuitry) for performing tasks including identifying clips to include in a playlist for a channel, editing clips, arranging clips in the playlist, and controlling the order and frequency with which clips are displayed on the channel, or other functions. An operating system 812 can control the allocation and usage of the components 802 and support application programs 814. The application programs 814 can include video games, mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include highlight clips, pointers to highlight clips, web addresses where highlight clips can be accessed, user-generated content, web pages, text, images, sound files, video data, or other data sets to be sent to or received from one or more network servers or other devices via one or more wired or wireless networks. The memory 820 can store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a screen 832 that is touch or hover sensitive, a microphone 834, a camera 836, a physical keyboard 838, or trackball 840. The mobile device 800 may also support output devices 850 including, but not limited to, a speaker 852 and a display 854. Other possible input devices (not shown) include accelerometers (e.g., one dimensional, two dimensional, three dimensional). Other possible output devices (not shown) can include piezoelectric or other haptic output devices. Some devices can serve more than one input/output function. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electro-encephalogram (EEG) and related methods). Thus, in one specific example, the operating system 812 or applications 814 may include speech-recognition software as part of a voice user interface that allows a user to operate the device 800 via voice commands. Further, the device 800 can include input devices and software that allow for user interaction via a user's spatial gestures, such as detecting and interpreting gestures to provide input to an application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Mobile device 800 may also communicate locally using, for example, near field communication (NFC) element 892.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a user-defined channel logic 899 that is configured to provide a functionality for the mobile device 800. For example, user-defined channel logic 899 may provide a client for interacting with a service (e.g., service 760, FIG. 7). Portions of the example methods described herein may be performed by user-defined channel logic 899. Similarly, user-defined channel logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data, "Computer-readable storage medium" does not refer to propagated signals. A computer-readable storage medium may take forms, including, but not limited to, non-volatile media, and volatile media. Non-volatile media may include, for example, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action (s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method operative on a local device employed by a local user, comprising:
    identifying local highlight clips selected for viewing by the local user, the local highlight clips associated with a video game on the local device;
    identifying remote highlight clips selected for viewing by the local user, the remote highlight clips associated with video games on respective remote devices employed by remote users, in which the local and remote devices are operatively coupled over a network;
    creating a virtual video playlist associated with an owner, the virtual video playlist comprising a set of local and remote highlight clips;
    establishing metadata associated with the local and remote highlight clips;
    utilizing the metadata to update the virtual video playlist to control a frequency of playing the local and remote highlight clips in the virtual video playlist, such that relatively newer highlight clips are more frequently played than relatively older highlight clips;
    providing the set of local and remote highlight clips for viewing collectively on a user-defined channel as controlled by the virtual video playlist, and
    when the local user replays particular video content, updating the virtual video playlist such that the particular video content is replicated and placed at a more prominent position within the virtual video playlist.

2. The method of claim 1, where identifying the highlight clip comprises detecting that the highlight clip has been generated by a player, detecting that the highlight clip has been generated by the video game, or detecting a user interface action that selects the highlight clip.

3. The method of claim 1, where the highlight clip is stored in a computer memory on a device on which the video game was played.

4. The method of claim 1, comprising selectively editing the highlight clip, where editing the highlight clip includes adding a voice-over to the highlight clip, trimming the highlight clip, adding another highlight clip to the highlight clip, adding text to the highlight clip, adding a graphic to the highlight clip, or adding a video effect to the highlight clip, where the video effect is a picture-in-picture effect, a side-by-side effect, or a timing effect.

5. The method of claim 4, where an editor for editing the highlight clip runs on a device on which the video game was played.

6. The method of claim 1, comprising establishing clip metadata for the highlight clip, where the clip metadata comprises a name for the highlight clip, a date on which the highlight clip was generated, a date on which the highlight clip was edited, a date on which the highlight clip was associated with the set of clips, a rating for the highlight clip, a length for the highlight clip, a video game from which the highlight clip was generated, or an identifier of the player of the video game.

7. The method of claim 6, where the clip metadata is produced on a device on which the video game was played.

8. The method of claim 1, where associating the highlight clip with the set of clips comprises storing the highlight clip with the set of clips, storing a pointer to the highlight clip with pointers associated with the set of clips, storing the highlight clip on a device on which the highlight clip was generated, storing the highlight clip on a device on which the highlight clip was edited, storing the highlight clip on a remote device, or storing the highlight clip using a service.

9. The method of claim 1, where providing the set of clips for viewing collectively comprises providing the set of clips for viewing on a device on which the highlight clip was generated, providing the set of clips for viewing on a device on which the highlight clip was edited, providing the set of clips for viewing on another device, or providing the set of clips to a service.

10. The method of claim 1, where providing the set of clips for viewing collectively comprises automatically controlling the frequency with which members of the set of clips are presented or controlling the order in which members of the set of clips are presented.

11. The method of claim 1, comprising selectively adding members to the set of clips, selectively removing members from the set of clips, selectively changing the order in which members of the set of clips are presented, or selectively changing the frequency with which members of the set of clips are presented.

12. The method of claim 1, comprising updating an electronic viewing guide with information concerning the user-defined channel, where the information concerning the user-defined channel comprises a channel name, a channel owner, a number of clips associated with the channel, a running time for the channel, a graphic associated with the channel, an update time associated with the channel, a rating associated with the channel, a popularity associated with the channel, or a placement indicator for the channel.

13. The method of claim 1, comprising updating a social status associated with the player of the video game or the owner of the user-defined channel based, at least in part, on a popularity of the highlight clip or a popularity of the user-defined channel.

14. The method of claim 1, wherein the virtual video playlist is continuously updated to be out-of-order according to a non-linear user selection of the particular video content to watch, wherein the user selection is based on the user's fast-forward, jump, or rewind to the particular video content.

15. A computer-readable storage medium storing computer-executable instructions that when executed by a local computer cause the local computer to:
identify a highlight clip associated with a video game by detecting that the highlight clip has been generated by a player, by detecting that the highlight clip has been generated by the video game, or by detecting a user interface action that selects the highlight clip, where the highlight clip is stored in a computer memory on a device on which the video game was played, where the identified highlight clip is associated with a local user of the local computer, or the identified highlight clip is associated with one or more remote computers employed by respective one or more remote users, in which the local and remote computers are operatively coupled over a network;
selectively edit the highlight clip, where editing the highlight clip includes adding a voice-over to the highlight clip, trimming the highlight clip, adding another highlight clip to the highlight clip, adding text to the highlight clip, adding a graphic to the highlight clip, or adding a video effect to the highlight clip, where the video effect is a picture-in-picture effect, a side-by-side effect, or a timing effect, and where an editor for editing the highlight clip runs on the device on which the video game was played;
establish clip metadata for the highlight clip, where the clip metadata comprises a name for the highlight clip, a date on which the highlight clip was generated, a date on which the highlight clip was edited, a date on which the highlight clip was associated with the set of clips, a rating for the highlight clip, a length for the highlight clip, a video game from which the highlight clip was generated, or an identifier of the player of the video game, and where the clip metadata is produced on the device on which the video game was played;
associate the highlight clip with a set of clips comprising highlight clips associated with the local user and highlight clips associated with the remote users and arranged in a virtual video playlist associated with an owner, where associating the highlight clip with the set of clips comprises storing the highlight clip with the set of clips, storing a pointer to the highlight clip with pointers associated with the set of clips, storing the highlight clip on the device on which the highlight clip was generated, storing the highlight clip on the device on which the highlight clip was edited, storing the highlight clip on a remote device, or storing the highlight clip using a service;
provide the set of clips for viewing collectively on a user-defined channel as controlled by the virtual video playlist, where providing the set of clips for viewing collectively comprises providing the set of clips for viewing on the device on which the highlight clip was generated, providing the set of clips for viewing on the device on which the highlight clip was edited, providing the set of clips for viewing on another device, or providing the set of clips to a service, and where providing the set of clips for viewing collectively comprises automatically controlling the frequency with which members of the set of clips are presented or controlling the order in which members of the set of clips are presented, based, at least in part, on a random order, on a most frequently viewed order, on a least frequently viewed order, on a most recently created order, or on a least recently created order;
selectively add members to the set of clips, selectively remove members from the set of clips, selectively change the order in which members of the set of clips are presented, or selectively change the frequency with which members of the set of clips are presented, based, at least in part, on how frequently the member is viewed, on how recently the member has been viewed, on how recently the member was created, or randomly;
update an electronic viewing guide with information concerning the user-defined channel, where the information concerning the user-defined channel comprises a channel name, a channel owner, a number of clips associated with the channel, a running time for the channel, a graphic associated with the channel, an update time associated with the channel, a rating associated with the channel, a popularity associated with the channel, or a placement indicator for the channel,
update a social status associated with the player of the video game or the owner of the user-defined channel based, at least in part, on a popularity of the highlight clip or a popularity of the user-defined channel;
utilize the clip metadata to automatically update the virtual video playlist to control a playing order of highlight clips of the local and remote users in the virtual video playlist, and to control a frequency of playing the highlight clips of the local and remote users in the virtual video playlist, such that relatively newer highlight clips are more frequently played than relatively older highlight clips; and
when the local user replays particular video content, updating the virtual video playlist such that the particular video content is replicated and placed at a more prominent position within the virtual video playlist.

16. A local apparatus employed by a local user and operatively coupled to a network of one or more remote apparatuses employed by respective one or more remote users, comprising:
a processor;
a memory;
a set of logics configured to provide a virtual video playlist comprising user-generated video content from the local and remote users, and
an interface to connect the processor, the memory, and the set of logics,
the set of logics comprising:

a first logic configured to acquire user-generated video content from the local user and user-generated video content from the remote users;

a second logic configured to organize the acquired user-generated video content into the virtual video playlist, wherein the second logic is further configured to present the user-generated video content acquired from the local and remote users to the local user on a user interface, and wherein the user interface is configured to enable the local user to make selections from the presented user-generated content, and a third logic configured to control how the user-generated video content associated with the virtual video playlist is played, wherein the third logic is further configured to utilize the local user's selections from among the user-generated content from the local user and the user-generated content from the remote users to automatically update the virtual video playlist, wherein the third logic is further configured to establish metadata associated with the user-generated content from the local and remote users, and utilize the metadata to update the virtual video playlist to control a playing order of the user-generated video content from the local and remote users in the virtual video playlist, and to control a frequency of playing of the user-generated video content from the local and remote users in the virtual video playlist, such that relatively newer user-generated content is more frequently played than relatively older user-generated content; and wherein when the local user navigates to particular video content, then updating the virtual video playlist such that the particular video content is replicated and placed at a more prominent position within the virtual video playlist.

17. The apparatus of claim 16, where the first logic is configured to acquire the user-generated video content from an automatic highlight producer associated with a video game, from a video game data store in response to a user interface action, from an application data store in response to a user interface action, from a highlight producer associated with a player of the video game, from a memory in a phone configured with a video camera, from a video camera, or from a different virtual video playlist in response to a user interface action.

18. The apparatus of claim 17, where the second logic is configured to store the user-generated video content that was organized into the virtual video playlist in a combination of the memory on the apparatus, a memory associated with a device from which the user-generated video content was acquired, and a service.

19. The apparatus of claim 17, where the third logic is configured to control the order in which an element of the virtual video playlist is played or the frequency with which the element of the virtual video playlist is played based, at least in part, a creator of the element, a number of times the element has been viewed, a popularity of the element, or a length of the element.

20. The apparatus of claim 17, comprising a fourth logic configured to edit user-generated video content, where the fourth logic is configured to edit the user-generated video content by adding a voice-over to the user-generated video content, by adding music to the user-generated video content, by combining two or more pieces of user-generated video content into a single piece of user-generated video content, by adding text to the user-generated video content, by adding a graphic to the user-generated video content, or by adding a video effect to the user-generated video content.

\* \* \* \* \*